United States Patent [19]

Chen et al.

[11] Patent Number: 5,678,517
[45] Date of Patent: Oct. 21, 1997

[54] INTERNAL COMBUSTION RECIPROCATING ENGINE AND METHOD FOR BURNING A MIXTURE OF FUEL AND AIR THEREIN

[75] Inventors: Tze-Ning Chen, Sudbury; Robert J. Raymond, Watertown, both of Mass.

[73] Assignee: Thermo Power Corporation, Waltham, Mass.

[21] Appl. No.: 696,035

[22] Filed: Aug. 9, 1996

[51] Int. Cl.$^6$ .................................................. F02B 31/00
[52] U.S. Cl. ........................................................ 123/263
[58] Field of Search ................................. 123/263, 260, 123/261, 262, 585, 254, 256, 531

[56] References Cited

U.S. PATENT DOCUMENTS

| | | | |
|---|---|---|---|
| 3,963,003 | 6/1976 | Downs | 123/263 |
| 4,178,903 | 12/1979 | Yanagihara et al. | 123/263 |
| 4,332,224 | 6/1982 | Latsch et al. | 123/254 |
| 4,483,289 | 11/1984 | Paul et al. | 123/263 |
| 5,009,207 | 4/1991 | Merritt | 123/261 |
| 5,040,504 | 8/1991 | Matsuoka | 123/254 |
| 5,060,609 | 10/1991 | Merritt | 123/256 |
| 5,255,658 | 10/1993 | Hoffer et al. | 123/531 |
| 5,520,157 | 5/1996 | Pontoppidan | 123/585 |

*Primary Examiner*—Raymond A. Nelli
*Attorney, Agent, or Firm*—Pandiscio & Pandiscio

[57] ABSTRACT

An internal combustion reciprocating engine includes a cylinder defining a main combustion chamber, a piston reciprocally movable in the cylinder, and a cylinder head providing an end wall for the main combustion chamber. A body is mounted in the cylinder head and is provided with an end wall substantially coincident with the main combustion chamber end wall, the body defining a pre-chamber and a passage interconnecting the pre-chamber and the cylinder. The body is in contact with the cylinder head only proximate the end wall of the body, the remainder of the body being insulated from the cylinder head, to store heat for heating air and vaporizing fuel introduced into the pre-chamber. A fuel inlet is in communication with the pre-chamber, and a spark source is mounted in the body and exposed to the pre-chamber. The invention further contemplates a method for burning a mixture of fuel and air in an internal combustion engine having a cylinder defining a main combustion chamber, and a piston reciprocally movable in the cylinder, the method comprising the steps of igniting a mixture of fuel and air in a pre-chamber, and directing a high velocity jet of air and remaining unburned fuel in fine droplet form from the pre-chamber and into the main combustion chamber wherein the high-velocity jet causes vaporization, ignition and combustion of the remaining unburned fuel in the main combustion chamber.

42 Claims, 5 Drawing Sheets

INTERNAL COMBUSTION RECIPROCATING ENGINE AND METHOD FOR BURNING A MIXTURE OF FUEL AND AIR THEREIN

BACKGROUND OF THE INVENTION

(1) Field of the Invention

The invention relates to fossil-fueled engines, and is directed more particularly to an internal combustion reciprocating engine, and to a method for burning a mixture of fuel and air in such an engine.

(2) Description of the Prior Art

Injection of fuel directly into the cylinders of reciprocating engines has advantages known in the art. Accordingly, direct fuel injection has been pursued for many years, but with only limited success. One of the most successful direct injection systems to date employs an air blast which produces a very fine spray of fuel droplets. There is, however, still a need for a combustion system in which the vaporization of fuel and air is controlled, providing more consistent ignition and combustion of fuel injected directly into engine cylinders.

SUMMARY OF THE INVENTION

It is, then, an object of the invention to provide an internal combustion engine wherein fuel is injected directly into its power cylinder, or an ancillary chamber connected to the power cylinder.

A further object of the invention is to provide a method for burning a mixture of fuel and air in an internal combustion engine.

With the above and other objects in view, as will hereinafter appear, a feature of the present invention is the provision of an internal combustion reciprocating engine comprising a cylinder defining a main combustion chamber, a piston reciprocally movable in the main combustion chamber, and a cylinder head providing an end wall for the main combustion chamber. A body is mounted in the cylinder head and is provided with an end wall substantially coincident with the main combustion chamber end wall, the body defining a pre-chamber and a passage interconnecting the pre-chamber and the main combustion chamber. A fuel inlet is in communication with the pre-chamber, and a spark source is mounted in the body and exposed to the pre-chamber.

In accordance with a further feature of the invention, there is provided an internal combustion reciprocating engine comprising a cylinder defining a main combustion chamber, a piston reciprocally movable in the cylinder, and a cylinder head providing an end wall for the main combustion chamber. A body is mounted in the cylinder head and is provided with an end wall substantially coincident with the main combustion chamber end wall, the body defining a pre-chamber and a passage interconnecting the pre-chamber and the main combustion chamber, the pre-chamber being of substantially circular configuration in at least one cross-section, and the passage entering the pre-chamber in a generally tangential manner, such that fluid entering the pre-chamber by way of the passage swirls along an inside curved wall of the pre-chamber. A fuel inlet is in communication with the pre-chamber, and a spark source is mounted in the body and exposed to the pre-chamber.

In accordance with another feature of the invention, there is provided an internal combustion reciprocating engine comprising a cylinder defining a main combustion chamber, a piston reciprocally movable in the cylinder, and a cylinder head providing an end wall for the main combustion chamber. A body is mounted in the cylinder head and is provided with an end wall substantially coincident with the main combustion chamber end wall, the body defining a pre-chamber having an internal surface and a passage interconnecting the pre-chamber and the main combustion chamber. A wall is disposed in the pre-chamber adjacent to and spaced from the internal surface to define therebetween a fuel pocket, the fuel pocket being in communication with the passage. A fuel inlet is in communication with the fuel pocket, and a spark source is mounted in the cylinder head and exposed to the pre-chamber.

In accordance with a still further feature of the invention, there is provided an internal combustion reciprocating engine comprising a cylinder defining a main combustion chamber, a piston reciprocally movable in the cylinder, and a cylinder head providing an end wall for the main combustion chamber. A body is mounted in a recess in the cylinder head and is provided with an end wall substantially coincident with the main combustion chamber end wall, the body defining a pre-chamber and a passage interconnecting the pre-chamber and the main combustion chamber, the pre-chamber being substantially cylindrically-shaped. External walls of the pre-chamber are spaced from internal walls of the cylinder head recess to define therebetween an annular gap and a fuel inlet is in communication with the gap. The pre-chamber body further defines an orifice interconnecting the pre-chamber and the gap, the gap being in communication with the passage. A spark source is mounted in the cylinder head and exposed to the pre-chamber.

In accordance with a further feature of the invention, there is provided an internal combustion reciprocating engine comprising a cylinder defining a main combustion chamber, a piston reciprocally movable in the cylinder, and a cylinder head providing an end wall for the main combustion chamber. A body is mounted in the cylinder head and is provided with an end wall substantially coincident with the main combustion chamber end wall, the body defining a pre-chamber and a passage interconnecting the pre-chamber and the main combustion chamber. An auxiliary chamber is in communication with the pre-chamber, a fuel inlet is disposed proximate the auxiliary chamber, and a spark source is disposed in the auxiliary chamber.

In accordance with a still further feature of the invention, there is provided a method for burning a mixture of fuel and air in an internal combustion engine having a cylinder defining a main combustion chamber, and a piston reciprocally movable in the cylinder, the method comprising the steps of igniting a mixture of fuel and air in a pre-chamber, and directing a high velocity jet of air and remaining unburned fuel in fine droplet form from the pre-chamber and into the main combustion chamber wherein the high-velocity jet causes vaporization, ignition and combustion of the remaining unburned fuel in the main combustion chamber.

In accordance with a still further feature of the invention, there is provided a method for burning a mixture of fuel and air in an internal combustion engine having a cylinder defining a main combustion chamber, and a piston reciprocally movable in the cylinder, the method comprising the steps of igniting a mixture of fuel and air in a pre-chamber, and directing a high-velocity jet of air and remaining unburned fuel in fine droplet form from the pre-chamber and into the main combustion chamber wherein the high-velocity jet causes vaporization, ignition and combustion of the remaining unburned fuel in the main combustion chamber.

In accordance with a still further feature of the invention, there is provided a method for burning a mixture of fuel and air in an internal combustion engine having a cylinder defining a main combustion chamber, a piston reciprocally movable in the cylinder, and a cylinder head providing an end wall for the main combustion chamber, the method comprising the steps of providing a pre-chamber in communication with the main combustion chamber by way of a passage extending therebetween, injecting fuel into the pre-chamber during a selected one or both of intake stroke movement of the piston in the main combustion chamber and compression stroke movement of the piston in the main combustion chamber, the compression stroke movement being operable to move air from the main combustion chamber through the passage, into the pre-chamber to mix with the fuel therein, to thereby increase the temperature of the mixture, causing a portion of the fuel in the pre-chamber to vaporize, firing a spark source in the pre-chamber as the piston approaches the main combustion chamber end wall, to ignite the fuel-air mixture in the pre-chamber to force a high velocity jet of hot air and remaining unburned fuel, which atomizes into a fine spray of droplets, through the passage and into the main combustion chamber, wherein the high-velocity, high temperature jet causes vaporization, ignition and combustion of the remaining fuel in the main combustion chamber, and wherein the ignition and combustion of the fuel-air mixture in the pre-chamber heats the walls of the pre-chamber, such that upon introduction of air and fuel to the pre-chamber in a subsequent cycle, the hot walls of the pre-chamber heat the air and vaporize a portion of the fuel introduced into the pre-chamber.

In accordance with a still further feature of the invention, there is provided a method for burning a mixture of fuel and air in an internal combustion engine having a cylinder defining a main combustion chamber, a piston reciprocally movable in the cylinder, and a cylinder head providing an end wall for the main combustion chamber, the method comprising the steps of providing a pre-chamber in communication with the main combustion chamber by way of a passage extending therebetween, injecting fuel into a fuel pocket in communication with the passage during an intake stroke movement of the piston in the main combustion chamber and during an initial portion of a succeeding compression stroke of the piston in the main combustion chamber, the compression stroke being operable to move air from the main combustion chamber through the passage into the pre-chamber, the air moving through the passage causing a pressure differential on fuel in the fuel pocket and carrying the fuel into the pre-chamber to vaporize and mix with the air in the pre-chamber, the pressure differential acting on the fuel pocket to force fuel therein into the air flow through the passage, causing fuel to vaporize and mix with air entering said pre-chamber, firing a spark source in the pre-chamber as the piston approaches the main combustion chamber end wall, to ignite the fuel-air mixture in the pre-chamber to force a high-velocity jet of hot air and remaining unburned fuel, and fuel remaining in the fuel pocket, which atomizes into a fine spray of droplets, through the passage and into the combustion chamber, wherein the high-velocity jet causes vaporization, ignition and combustion of the fuel in the main combustion chamber, and wherein the ignition and combustion of the fuel-air mixture in the pre-chamber heats the walls of the pre-chamber, such that upon introduction of fuel and air to the pre-chamber in a subsequent cycle, the hot walls of the pre-chamber heat the air and vaporize a portion of the fuel introduced into the pre-chamber.

In accordance with another feature of the invention, there is provided a method for burning a mixture of fuel and air in an internal combustion engine having a cylinder defining a main combustion chamber, a piston reciprocally movable in the cylinder, and a cylinder head providing an end wall for the main combustion chamber, the method comprising the steps of providing a pre-chamber in communication with the main combustion chamber by way of a passage extending therebetween, providing an auxiliary chamber in communication with the pre-chamber, injecting fuel into the auxiliary chamber near the end of a compression stroke of the piston in the main combustion chamber, the injected fuel mixing with air forced from the main combustion chamber through the passage and the pre-chamber into the auxiliary chamber, firing a spark source in the auxiliary chamber to ignite a fuel-air mixture in the auxiliary chamber, continuing injection of fuel which passes through the auxiliary chamber, is inflamed in the auxiliary chamber, and passes on to the pre-chamber, the continued injection of fuel and the flow of air from the main combustion chamber being ignited in the pre-chamber by the influx of ignited fuel, to force a high-velocity jet of hot air and unburned fuel, which atomizes into a fine spray of droplets, through the passage and into the main combustion chamber, wherein the high-velocity jet causes vaporization, ignition and combustion of the fuel-air mixture in the main combustion chamber, and wherein the ignition and combustion of the fuel-air mixture in the auxiliary chamber and the pre-chamber heat the walls of the auxiliary chamber and the pre-chamber, such that upon introduction of fuel and air to the 1 auxiliary chamber and the pre-chamber in a subsequent cycle, the hot walls of the auxiliary chamber and the pre-chamber heat the air and vaporize a portion of the fuel introduced therein.

In accordance with still another feature of the invention, there is provided a method for burning a mixture of fuel and air in an internal combustion engine having a cylinder defining a main combustion chamber, a piston reciprocally movable in the cylinder, and a cylinder head providing an end wall for the main combustion chamber, the method comprising the steps of providing a pre-chamber in communication with the main combustion chamber by way of a passage extending therebetween, providing an auxiliary chamber in communication with the pre-chamber, injecting fuel into the pre-chamber and the auxiliary chamber near the end of a compression stroke of the piston in the main combustion chamber, the injected fuel mixing with air forced from the main combustion chamber through the passage and into the pre-chamber and the auxiliary chamber, firing a spark source in the auxiliary chamber to ignite a fuel-air mixture in the auxiliary chamber, continuing injection of fuel which passes adjacent the auxiliary chamber, is inflamed adjacent the auxiliary chamber, and passes on to the pre-chamber, the continued injection of fuel and the flow of air from the main combustion chamber being ignited in the pre-chamber by the influx of ignited fuel, to force a high-velocity jet of hot air and unburned fuel, which atomizes into a fine spray of droplets, through the passage and into the main combustion chamber, wherein the high-velocity jet causes vaporization, ignition and combustion of the fuel-air mixture in the main combustion chamber, and wherein the ignition and combustion of the fuel-air mixture in the auxiliary chamber and the pre-chamber heat the walls of the auxiliary chamber and the pre-chamber, such that upon introduction of fuel and air into the auxiliary chamber and the pre-chamber in a subsequent cycle, the hot walls of the auxiliary chamber and the pre-chamber heat the air and vaporize a portion of the fuel introduced therein.

The above and other features of the invention, including various novel details of construction and combinations of parts, will now be more particularly described with reference to the accompanying drawings and pointed out in the claims. It will be understood that the particular devices and methods embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings.

DESCRIPTION OF THE PREFERRED EMBODIMENTS

Figure 1:
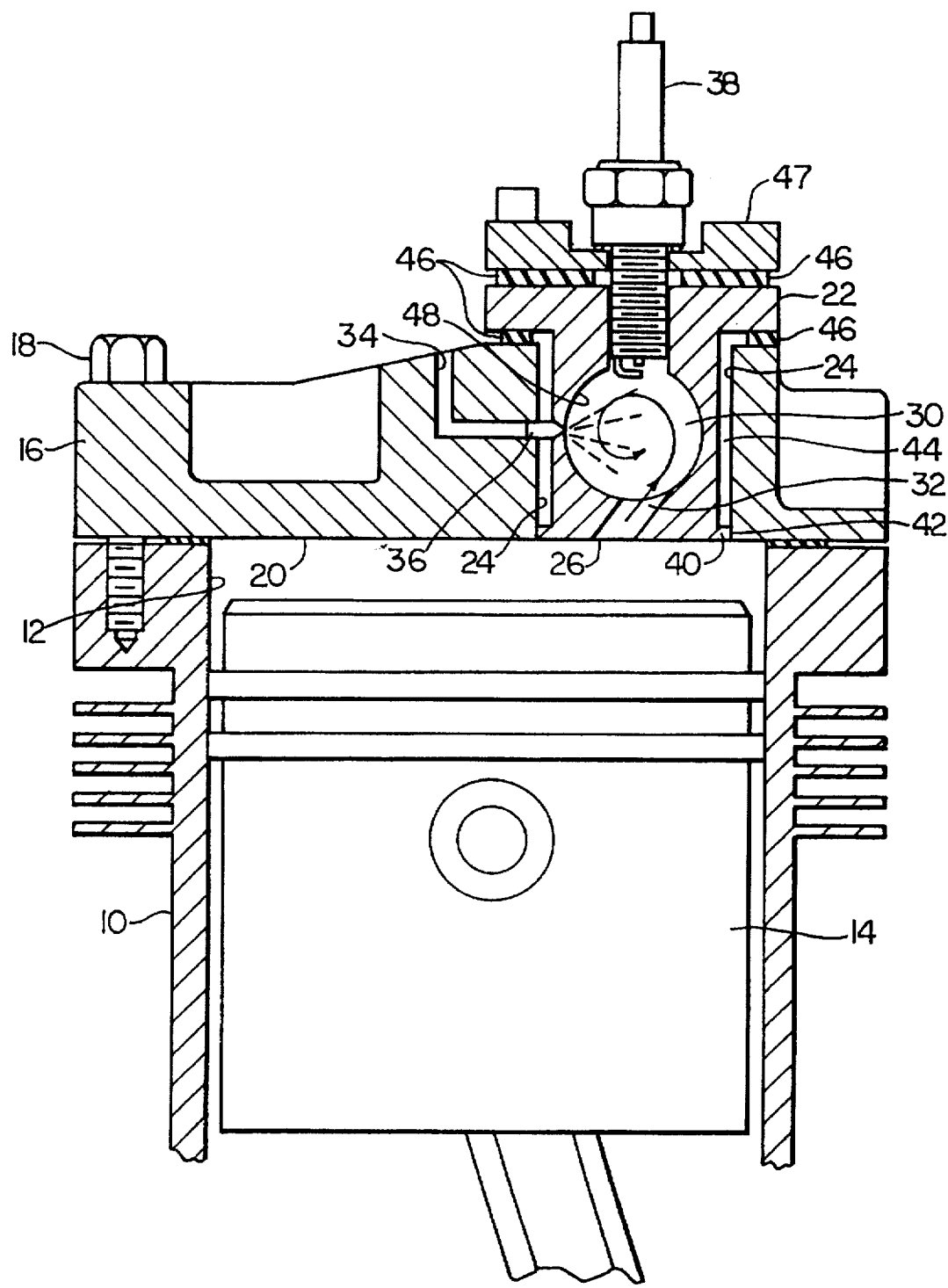
FIG. 1 is a sectional view of one form of a portion of an internal combustion engine, illustrative of an embodiment of the invention.

Referring to FIG. 1, it will be seen that an illustrative engine includes a cylinder 10 defining a main combustion chamber 12. A piston 14 is reciprocally movable in the cylinder 10, in well known fashion. A cylinder head 16 is fixed to the cylinder 10, as by lug bolts 18, and provides an end wall 20 for the main combustion chamber 12.

A body 22 is mounted in a bore 24 in the cylinder head 16. The body 22 is provided with an end wall 26 which is coincident with the cylinder head end wall 20; that is, the end wall 26 of the body 22 is in substantially the same plane as the cylinder head end wall 20 and serves as an extension of cylinder head end wall 20.

The body 22 defines a pre-chamber 30 and a passage 32 interconnecting the pre-chamber 30 and the main combustion chamber 12.

A fuel inlet includes a passageway 34 extending through the cylinder head 16 and, at an end of the passageway 34, a nozzle 36 in communication with the pre-chamber 30.

A spark source 38, such as a spark plug, is mounted in the body 22 and is exposed to the pre-chamber 30.

As is shown in FIG. 1, the body 22 is in contact with the cylinder head 16 only near the end wall 26 of the body 22. The body end wall 26 is part of a flange portion 40 having a periphery 42 engaged with the cylinder head bore 24. The remainder of the body 22 is insulated from the cylinder head 16 by an air gap 44 and by thermally insulative material gaskets 46 disposed between portions of the body 22 and the cylinder head 16, and between the body 22 and any retaining structure 47 (FIG. 1) mounted on the body 22 or cylinder head 16. Thus, heat generated in the pre-chamber 30 tends to be retained in the body 22, rather than immediately dissipating through the cylinder head 16 to a cooling medium.

The pre-chamber 30 is of a substantially circular configuration in at least one cross-section, such as that shown in FIG. 1, and the passage 32 enters the pre-chamber 30 in a generally tangential manner, such that air entering the pre-chamber 30 swirls along an inside curved surface 48, leading to mixing of fuel and air.

In operation, fuel is injected through the fuel inlet nozzle 36 into the pre-chamber 30, preferably starting during an intake stroke of the piston 14 in the main combustion chamber 12, and continuing during the succeeding compression stroke of the piston 14 in the main combustion chamber 12. The compression stroke of the piston 14 forces air from the main combustion chamber 12 through the passage 32, and into the pre-chamber 30, where the accumulation of air increases the temperature and pressure in the pre-chamber 30 while the incoming air mixes with the incoming fuel. The increase in temperature in the pre-chamber 30 causes a portion of the fuel to vaporize.

As the piston 14 approaches top dead center in its compression stroke, that is, approaches the end wall 20, the spark source 38 is fired, igniting and burning the mixture of air and a portion of the fuel which has been vaporized in the pre-chamber 30, resulting in a pressure rise in the pre-chamber 30, and forcing a high velocity jet of hot air, burning fuel, and remaining unburned fuel, which atomizes into a fine spray of droplets, through the passage 32 and into the main combustion chamber 12. The jet of burning fuel-air mixture causes vaporization, ignition and combustion of remaining fuel in the main combustion chamber 12, forcing the piston 14 into a working stroke.

The ignition and combustion of fuel-air mixture in the pre-chamber 30 heats the pre-chamber 30 and the body 22, which heat is in large measure retained by the body 22 until influx of fuel and air in a subsequent cycle, whereupon the hot walls of the pre-chamber 30 heat the air from the main combustion chamber 12 and vaporize a portion of the incoming fuel, to readily mix with the incoming air from the main combustion chamber 12.

Figure 2:
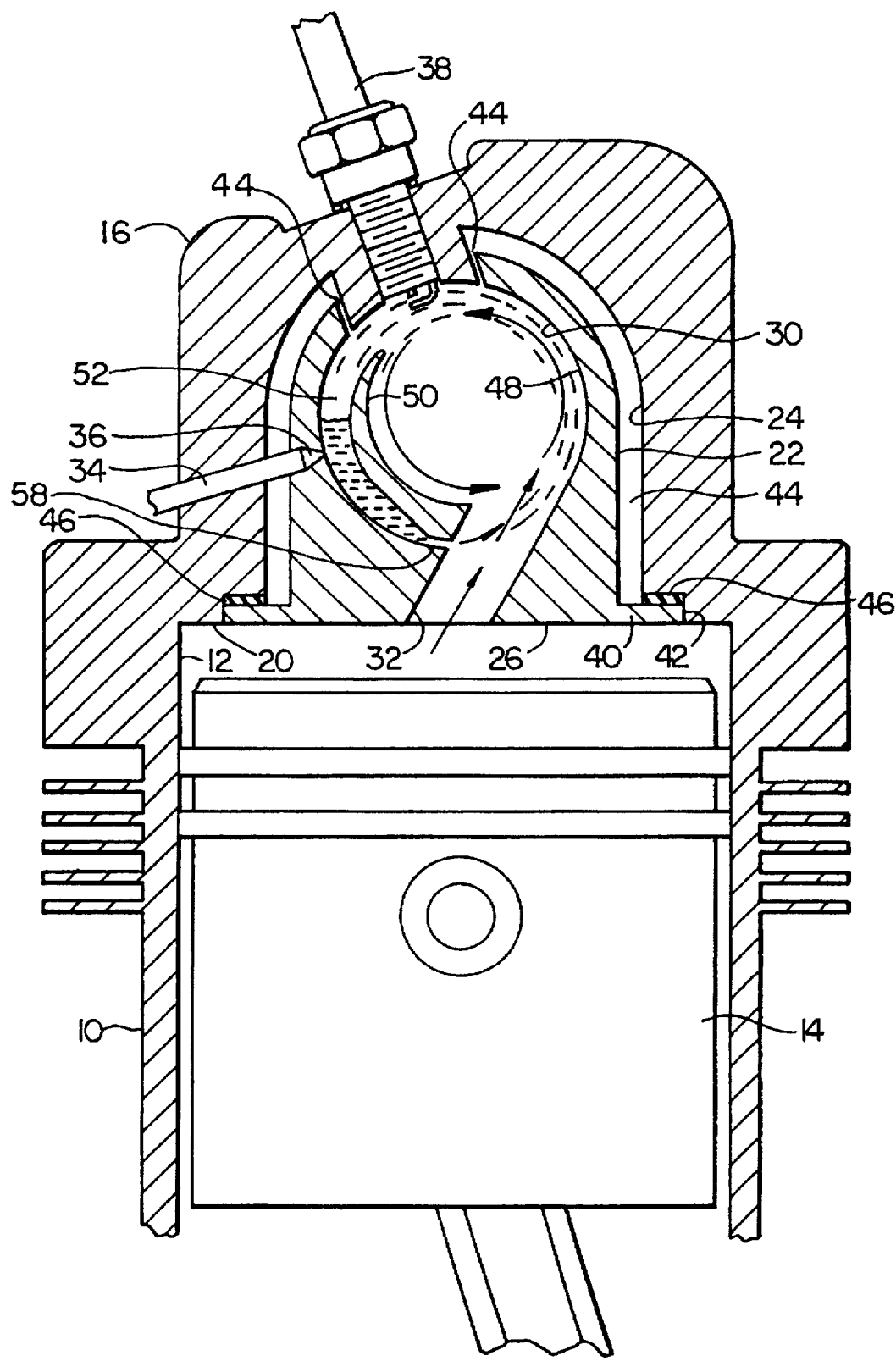
FIGS. 2–5 are similar to FIG. 1, but illustrative of alternative embodiments of internal combustion engines.

Referring to FIG. 2, it will be seen that in an alternative embodiment a curved internal wall 50 is disposed in the pre-chamber 30 and is adjacent to, and spaced from, the pre-chamber internal surface 48. The pre-chamber internal surface 48 and internal wall 50 define therebetween a fuel pocket 52 which is in communication with the passage 32 through a narrow passage 58. The fuel inlet nozzle 36 is disposed in the fuel pocket 52. The fuel pocket 52 is spaced from the air gap 44.

In operation, the embodiment shown in FIG. 2 functions in much the same manner as described above with respect to the embodiment shown in FIG. 1. However, when the compression stroke of the piston 14 forces air from the main combustion chamber 12 through the passage 32, the air traversing the passage 32 picks up fuel from the fuel pocket 52 and carries the fuel into the pre-chamber 30. The difference between the stagnation pressure imposed in the fuel in the pocket 52 and the static pressure in the passage 32 forces fuel in the pocket 52 into the passage 32, where the fuel mixes with air moving through the passage 32. Upon ignition and combustion in the pre-chamber 30, the high velocity jet of burning fuel, air, and unburned fuel is shot through the passage 32 and into the main combustion chamber 12. Simultaneously, the liquid fuel in the fuel pocket 52 is forcibly injected into the passage 32 and then carried into the main combustion chamber 12.

Figure 3:
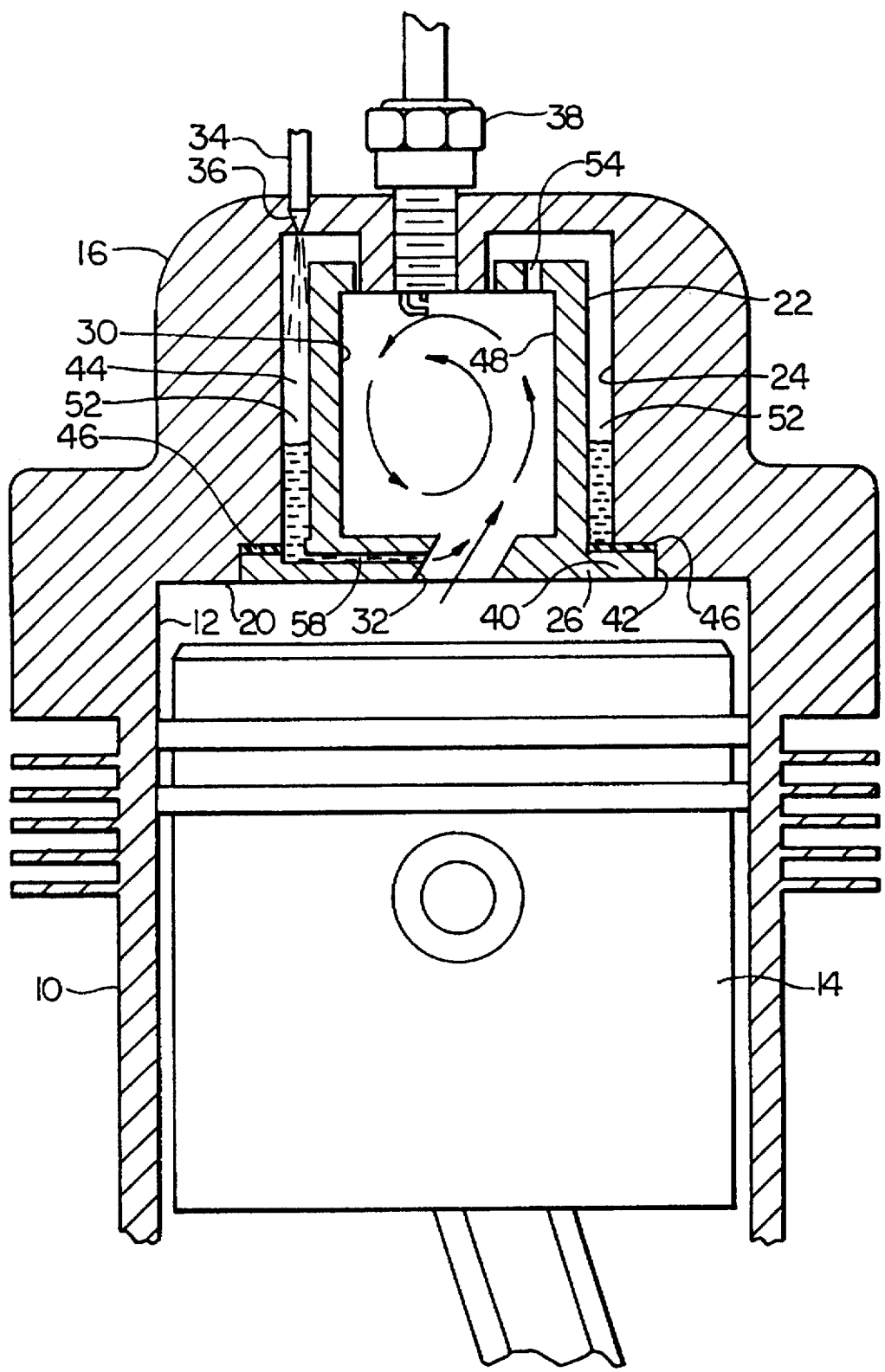

The embodiment shown in FIG. 3 operates in a similar fashion as the embodiment shown in FIG. 2. However, in the FIG. 3 embodiment the body 22 is substantially cylindrically-shaped and spaced from the cylindrically-shaped bore 24 in the cylinder head 16 to define therebetween the air gap 44 and fuel pocket 52. In this embodiment, the annular gap 44 serves as both an air gap for insulation of body 22 and the fuel pocket 52. An orifice 54 in the body 22 serves to place the pre-chamber 30 in communication with the annular gap 44. The orifice 54 is properly located to convey substantially the stagnation pressure of the incoming air jet through the orifice 54 to the gap 44 to urge fuel in the fuel pocket 52 through the narrow passage 58 into the passage 32, where the fuel mixes with incoming air from the main combustion chamber 12.

Ignition and combustion of the fuel-air mixture in the pre-chamber 30, by activation of the spark source 38, causes a jet of hot air, flaming fuel and unburned fuel to move through the passage 32 into the main combustion chamber 12. Simultaneously, the increased pressure in the pre-chamber 30 forces the fuel in the fuel pocket 52 into the passage 32, to be carried into the main combustion chamber 12.

Figure 4:
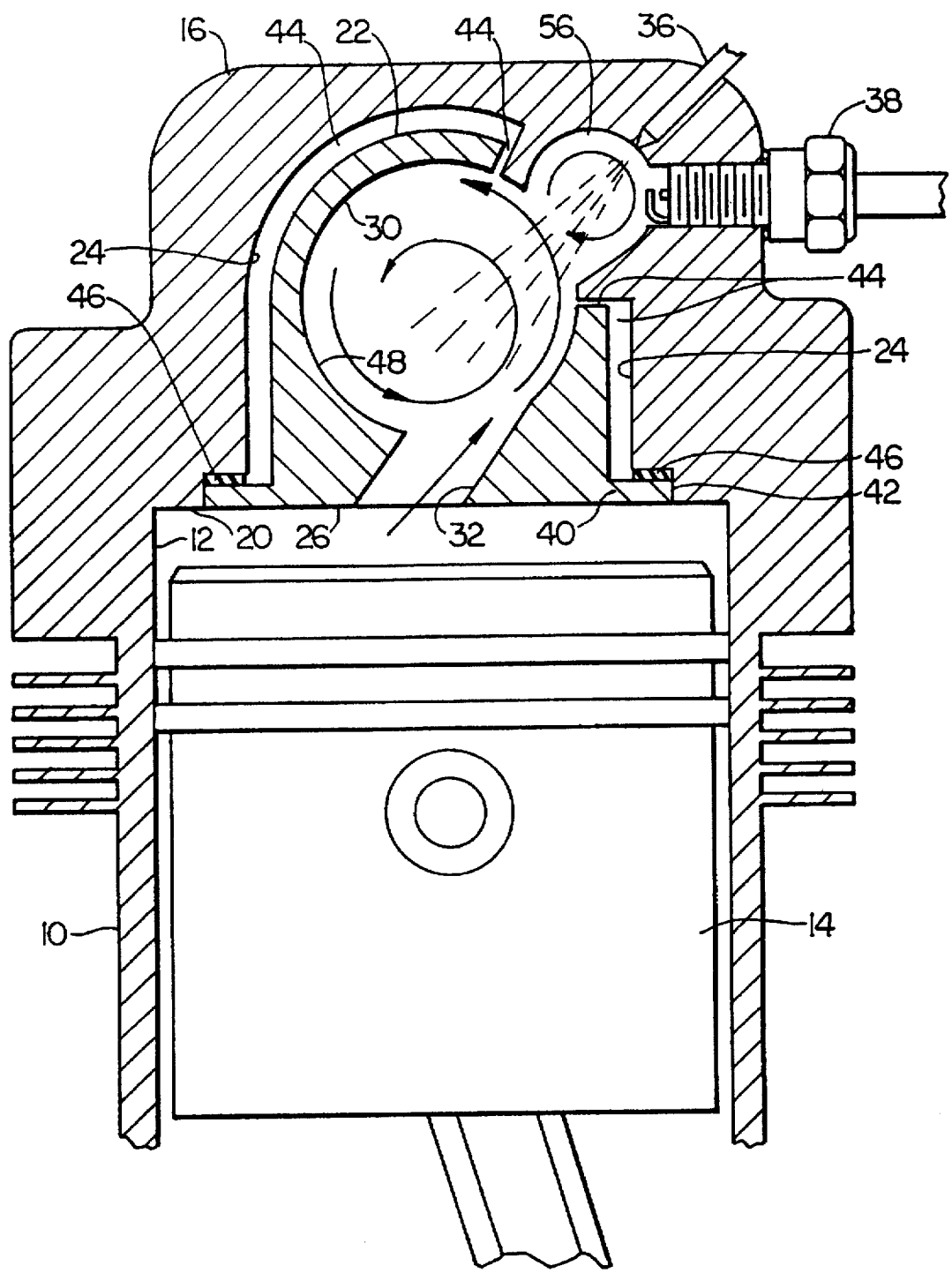
Figure 5:
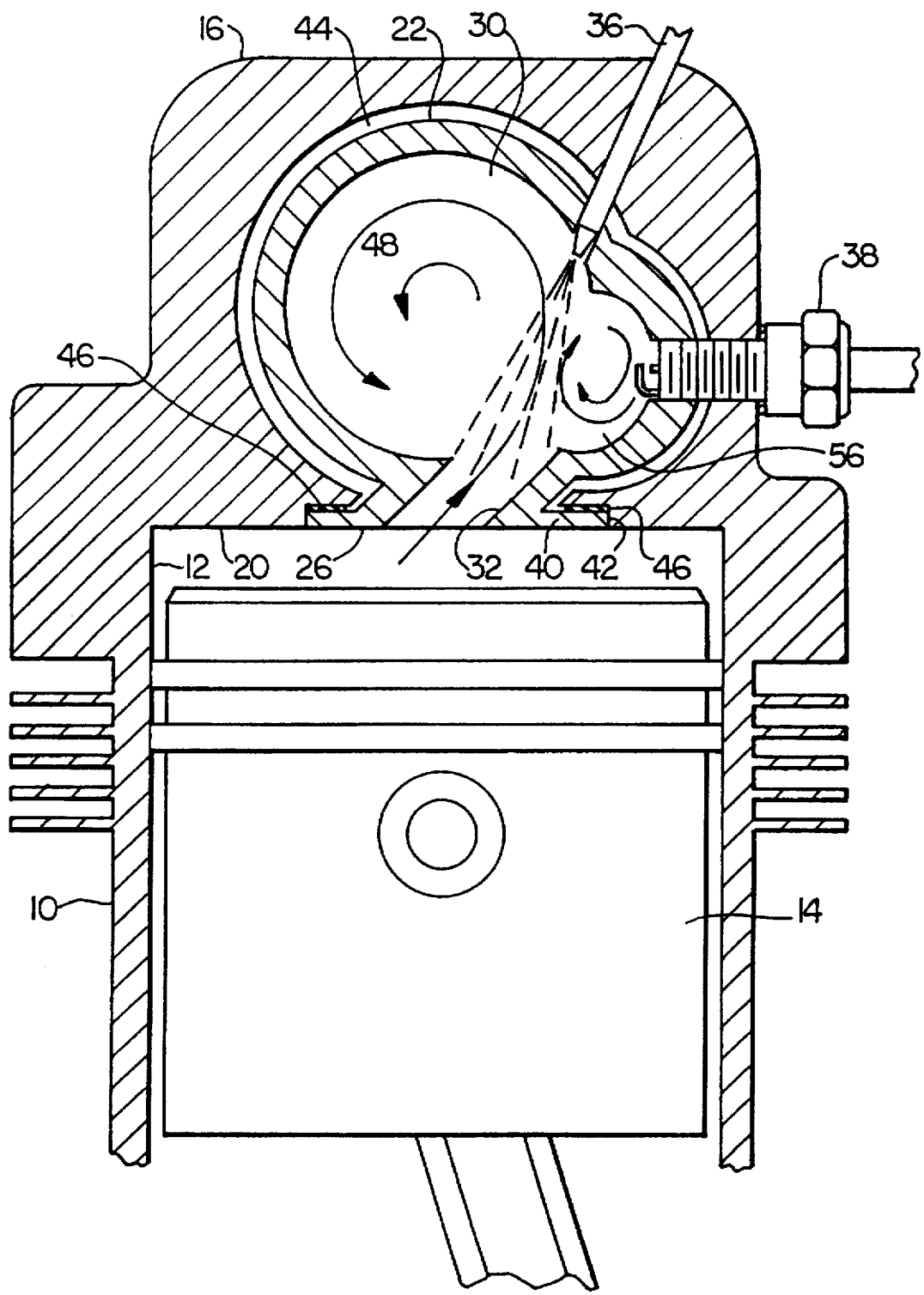

In FIGS. 4 and 5, there are shown alternative embodiments in which there is provided an auxiliary chamber 56. The fuel inlet nozzle 36 is proximate the auxiliary chamber 56. In the embodiment shown in FIG. 4, the nozzle 36 is disposed in the auxiliary chamber 56 and directed at the pre-chamber 30 and at the passage 32. In the embodiment shown in FIG. 5, the nozzle 36 is disposed in the pre-chamber 30 adjacent the auxiliary chamber 56 and directed at the passage 32. In both embodiments of FIGS. 4 and 5, the spark source 38 is disposed in the auxiliary chamber 56. As in the other embodiments shown and described herein, the body 22 is separated from the cylinder head 16 by the air gap 44 and gaskets 46. The auxiliary chamber 56 may be formed in the cylinder head 16, as shown in FIG. 4, or in the body 22, as shown in FIG. 5.

In operation of the embodiment shown in FIG. 4, fuel is injected into the auxiliary chamber 56 near the end of a compression stroke of the piston 14, by which air is forced from the main combustion chamber 12 into the pre-chamber 30 and the auxiliary chamber 56. The injected fuel passes through the auxiliary chamber 56 into the pre-chamber 30 and towards the passage 32 to mix with the incoming air from the passage 32. The swirling air motion in the auxiliary chamber 56 produces a combustible mixture of fuel vapor and air in the proximity of the spark source.

Activation of the spark source 38, in the auxiliary chamber 56, ignites the fuel-air mixture in the auxiliary chamber 56. The inflow of fuel is continued after ignition, with the fuel being injected into the pre-chamber 30 as partly inflamed fuel and partly unburned fuel, causing combustion of the fuel-air mixture in the pre-chamber 30. Combustion in the pre-chamber 30 forces a high-velocity jet of hot air, burning fuel, and unburned fuel, which atomizes into a fine spray of droplets, through the passage 32 and into the main combustion chamber 12, wherein the high-velocity jet causes vaporization, ignition and combustion of the mixture of air and unburned fuel in the main combustion chamber 12.

The combustion of the fuel-air mixture in the auxiliary chamber 56 and the pre-chamber 30 heats the walls of the chambers 56, 30, which heat is held by the body 22 which is substantially insulated from the cylinder head 16. Upon introduction of air and fuel to the auxiliary chamber 56 and the pre-chamber 30 in a subsequent cycle, the hot walls of the chambers 56, 30 heat the air and vaporize a portion of the incoming fuel, to assist in mixing of air and fuel.

The directing of incoming fuel towards the passage 32 contributes to the transfer of unburned fuel into the main combustion chamber 12, despite ignition and combustion in the auxiliary chamber 56 and in the pre-chamber 30.

The operation of the embodiment shown in FIG. 5 is quite similar to the operation of the embodiment shown in FIG. 4. A difference is that the fuel inlet nozzle 36 of the FIG. 5 embodiment injects fuel directly into the pre-chamber 30. However, the incoming stream of fuel passes adjacent to and into the auxiliary chamber 56 and close to spark source 38, such that activation of the spark source 38 serves to ignite the fuel-air mixture in the auxiliary chamber 56, the ignition and combustion progressing into the pre-chamber 30, through the passage 32, and into the main combustion chamber 12.

It is to be understood that the present invention is by no means limited to the particular construction and method steps herein disclosed and/or shown in the drawings, but also comprises any modifications or equivalents within the scope of the claims.

Having thus described our invention, what we claim is new and desire to secure by Letters Patent of the United States is:

1. An internal combustion reciprocating engine comprising:
    a cylinder defining a main combustion chamber;
    a piston reciprocally movable in said cylinder;
    a cylinder head providing a first portion of an end wall for said main combustion chamber;
    a body mounted in said cylinder head and provided with an end wall disposed wholly within said cylinder head end wall first portion and comprising a second portion of said main combustion chamber end wall, said body defining a pre-chamber and a passage interconnecting said pre-chamber and said main combustion chamber;
    a fuel inlet in communication with said pre-chamber; and
    a spark source mounted in said body and exposed to said pre-chamber.

2. The engine in accordance with claim 1 wherein said body is in contact with said cylinder head only proximate said end wall of said body, the remainder of said body being insulated from said cylinder head.

3. The engine in accordance with claim 2 wherein at least a first portion of said remainder of said body is insulated from said cylinder head by an air gap therebetween.

4. The engine in accordance with claim 3 wherein a second portion of said remainder of said body is insulated from said cylinder head by thermally insulative material therebetween.

5. The engine in accordance with claim 1 wherein said body is separated from said cylinder head by an air gap therebetween.

6. An internal combustion reciprocating engine comprising:
    a cylinder defining a main combustion chamber;
    a piston reciprocally movable in said cylinder;
    a cylinder head providing an end wall for said main combustion chamber;
    a body mounted in said cylinder head and provided with an end wall substantially coincident with said main combustion chamber end wall, said body defining a pre-chamber and a passage interconnecting said pre-chamber and said main combustion chamber;
    a fuel inlet in communication with said pre-chamber; and
    a spark source mounted in said body and exposed to said pre-chamber;
    wherein said body is provided with a pocket for retaining liquid fuel, and said fuel inlet directs fuel into said pocket.

7. The engine in accordance with claim 6 wherein said pocket is in communication with said passage.

8. The engine in accordance with claim 1 wherein said cylinder head defines an auxiliary chamber in communication with said pre-chamber;

said fuel inlet being disposed proximate said auxiliary chamber; and said spark source being disposed in said auxiliary chamber.

9. An internal combustion reciprocating engine comprising:

a cylinder defining a main combustion chamber;

a piston reciprocally movable in said cylinder;

a cylinder head providing a first portion of an end wall for said main combustion chamber;

a body mounted in said cylinder head and having an end wall disposed wholly within said cylinder head end wall first portion and comprising a second portion of said main combustion chamber end wall, said body defining a pre-chamber and a passage interconnecting said pre-chamber and said main combustion chamber, said pre-chamber being of substantially circular configuration in at least one cross-section, and said passage entering said pre-chamber in a generally tangential manner, such that fluid entering said pre-chamber by way of said passage swirls along an inside curved wall of said pre-chamber;

a fuel inlet in communication with said pre-chamber; and a spark source mounted in said body and exposed to said pre-chamber.

10. The engine in accordance with claim 9 wherein said body is in contact with said cylinder head only proximate said end wall of said body, the remainder of said body being insulated from said cylinder head.

11. The engine in accordance with claim 10 wherein at least a first portion of said remainder of said body is insulated from said cylinder head by an air gap therebetween.

12. The engine in accordance with claim 11 wherein a second portion of said remainder of said body is insulated from said cylinder head by thermally insulative material therebetween.

13. An internal combustion reciprocating engine comprising:

a cylinder defining a main combustion chamber;

a piston reciprocally movable in said cylinder;

a cylinder head providing an end wall for said main combustion chamber;

a body mounted in said cylinder head and having an end wall substantially coincident with said main combustion chamber end wall, said body defining a pre-chamber having an internal surface and a passage interconnecting said pre-chamber and said main combustion chamber;

a wall disposed in said pre-chamber adjacent to and spaced from said internal surface to define therebetween a fuel pocket, said fuel pocket being in communication with said passage;

a fuel inlet in communication with said fuel pocket; and a spark source mounted in said cylinder head and exposed to said pre-chamber.

14. The engine in accordance with claim 13 wherein said body is in contact with said cylinder head only proximate said end wall of said body, the remainder of said body being insulated from said cylinder head.

15. The engine in accordance with claim 14 wherein at least a first portion of said remainder of said body is insulated from said cylinder head by an air gap therebetween.

16. The engine in accordance with claim 15 wherein a second portion of said remainder of said body is insulated from said cylinder head by thermally insulative material therebetween.

17. The engine in accordance with claim 15 wherein said fuel pocket is spaced from said air gap.

18. The engine in accordance with claim 17 wherein said pre-chamber in at least one cross-section is of generally circular configuration, said internal wall is of a curved configuration, and an opening at one end of said pocket is exposed to said passage.

19. An internal combustion reciprocating engine comprising:

a cylinder defining a main combustion chamber;

a piston reciprocally movable in said cylinder;

a cylinder head providing an end wall for said main combustion chamber;

a body mounted in a recess in said cylinder head and having an end wall substantially coincident with said main combustion chamber end wall, said body defining a pre-chamber and a passage interconnecting said pre-chamber and said main combustion chamber, said pre-chamber being substantially cylindrically-shaped, external walls of said pre-chamber being spaced from internal walls of said cylinder head recess to define therebetween an annular gap;

a fuel inlet in communication with said gap;

said pre-chamber body further defining an orifice interconnecting said pre-chamber and said gap;

said gap being in communication with said passage; and a spark source mounted in said cylinder head and exposed to said pre-chamber.

20. The engine in accordance with claim 19 wherein said body is in contact with said cylinder head only proximate said end wall of said body, the remainder of said body being insulated from said cylinder head.

21. The engine in accordance with claim 20 wherein at least a first portion of said remainder of said body is insulated from said cylinder head by an air gap therebetween.

22. The engine in accordance with claim 21 wherein a second portion of said remainder of said body is insulated from said cylinder head by thermally insulative material therebetween.

23. The engine in accordance with claim 19 wherein said gap serves as an air gap insulator separating portions of said body from said cylinder head, and further serves as a fuel pocket opening into said passage.

24. An internal combustion reciprocating engine comprising:

a cylinder defining a main combustion chamber;

a piston reciprocally movable in said cylinder;

a cylinder head providing a first portion of an end wall for said main combustion chamber;

a body mounted in said cylinder head and having an end wall disposed wholly within said cylinder head end wall first portion and comprising a second portion of said main combustion chamber end wall, said body defining a pre-chamber and a passage interconnecting said pre-chamber and said main combustion chamber;

an auxiliary chamber in communication with said pre-chamber;

a fuel inlet disposed proximate said auxiliary chamber; and a spark source disposed in said auxiliary chamber.

25. The engine in accordance with claim 24 wherein said body is in contact with said cylinder head only proximate said end wall of said body, the remainder of said body being insulated from said cylinder head.

26. The engine in accordance with claim 25 wherein at least a first portion of said remainder of said body is insulated from said cylinder head by an air gap therebetween.

27. The engine in accordance with claim 26 wherein a second portion of said remainder of said body is insulated from said cylinder head by thermally insulative material therebetween.

28. The engine in accordance with claim 24 wherein said fuel inlet includes a fuel injection nozzle which is disposed in said auxiliary chamber and is aligned with said pre-chamber and said passage.

29. The engine in accordance with claim 24 wherein said fuel inlet includes a fuel injection nozzle which is disposed in said pre-chamber and is aligned with said passage and is positioned relative to said auxiliary chamber such that a fuel stream from said nozzle in part enters said auxiliary chamber.

30. The engine in accordance with claim 24 wherein said cylinder head defines said auxiliary chamber.

31. The engine in accordance with claim 24 wherein said body defines said auxiliary chamber.

32. A method for burning a mixture of fuel and air in an internal combustion engine having a cylinder defining a main combustion chamber, and a piston reciprocally movable in the cylinder, the method comprising the steps of:

provide igniting a mixture of fuel and air in a pre-chamber; and directing a high velocity jet of air and remaining unburned fuel in fine droplet form from said pre-chamber and into said main combustion chamber wherein said high-velocity jet causes vaporization, ignition and combustion of said remaining unburned fuel in said main combustion chamber.

33. A method for burning a mixture of fuel and air in an internal combustion engine having a cylinder defining a main combustion chamber, a piston reciprocally movable in the cylinder, and a cylinder head providing an end wall for the main combustion chamber, the method comprising said steps of:

providing a pre-chamber in communication with said main combustion chamber by way of a passage extending therebetween;

injecting fuel into said pre-chamber during a selected one or both of intake stroke movement of said piston in said main combustion chamber and compression stroke movement of said piston in said main combustion chamber, said compression stroke movement being operable to move air from said main combustion chamber through said passage, into said pre-chamber to mix with the fuel therein, to thereby increase the temperature of said mixture, causing a portion of the fuel in said pre-chamber to vaporize;

firing a spark source in said pre-chamber as said piston approaches said main combustion chamber end wall, to ignite the fuel-air mixture in said pre-chamber to force a high velocity jet of hot air and remaining unburned fuel, which atomizes into a fine spray of droplets, through said passage and into said main combustion chamber;

wherein said high-velocity, high temperature jet causes vaporization, ignition and combustion of said remaining fuel in said main combustion chamber; and wherein said ignition and combustion of said fuel-air mixture in said pre-chamber heats said walls of said pre-chamber, such that upon introduction of fuel and air to said pre-chamber in a subsequent cycle, the hot walls of said pre-chamber heat the air and vaporize a portion of said fuel introduced into said pre-chamber.

34. The method in accordance with claim 33 including the additional step of substantially insulating a body defining said pre-chamber and said passage from said cylinder head.

35. A method for burning a mixture of fuel and air in an internal combustion engine having a cylinder defining a main combustion chamber, a piston reciprocally movable in the cylinder, and a cylinder head providing an end wall for the main combustion chamber; the method comprising the steps of:

providing a pre-chamber in communication with said main combustion chamber by way of a passage extending therebetween;

injecting fuel into a fuel pocket in communication with said passage during an intake stroke movement of said piston in said main combustion chamber and during an initial portion of a succeeding compression stroke of said piston in said main combustion chamber, said compression stroke being operable to move air from said main combustion chamber through said passage into said pre-chamber, said air moving through said passage causing a pressure differential on fuel in said fuel pocket and carrying said fuel into said pre-chamber to vaporize and mix with the air in the pre-chamber, said pressure differential acting on said fuel pocket to force fuel therein into said air flow through said passage, causing fuel to vaporize and mix with air entering said pre-chamber;

firing a spark source in said pre-chamber as said piston approaches said main combustion chamber end wall, to ignite the fuel-air mixture in said pre-chamber to force a high-velocity jet of hot air and remaining unburned vaporized fuel, and fuel remaining in said fuel pocket, which atomizes into a fine spray of droplets, through said passage and into said main combustion chamber;

wherein said high-velocity jet causes vaporization, ignition and combustion of the fuel in said main combustion chamber; and wherein said ignition and combustion of the fuel-air mixture in said pre-chamber heats the walls of said pre-chamber, such that upon introduction of fuel and air to said pre-chamber in a subsequent cycle, the hot walls of said pre-chamber heat the air and vaporize a portion of the fuel introduced into said pre-chamber.

36. The method in accordance with claim 35 including the additional step of substantially insulating a body defining said pre-chamber and said passage from said cylinder head.

37. A method for burning a mixture of fuel and air in an internal combustion engine having a cylinder defining a main combustion chamber, a piston reciprocally movable in the cylinder, and a cylinder head providing an end wall for the main combustion chamber, the method comprising said steps of:

providing a pre-chamber in communication with said main combustion chamber by way of a passage extending therebetween;

providing an auxiliary chamber in communication with said pre-chamber;

injecting fuel into said auxiliary chamber near the end of a compression stroke of said piston in said main combustion chamber, said injected fuel mixing with air forced from said main combustion chamber through said passage and said pre-chamber into said auxiliary chamber;

firing a spark source in said auxiliary chamber to ignite a fuel-air mixture in said auxiliary chamber;

continuing injection of fuel which passes through said auxiliary chamber, is inflamed in said auxiliary chamber, and passes on to said pre-chamber, said continued injection of fuel and said flow of air from said main combustion chamber being ignited in said pre-chamber by the influx of ignited fuel, to force a high-velocity jet of hot air and unburned fuel, which atomizes into a fine spray of droplets, through said passage and into said main combustion chamber;

wherein said high-velocity jet causes vaporization, ignition and combustion of the fuel-air mixture in said main combustion chamber; and wherein said ignition and combustion of the fuel-air mixture in said auxiliary chamber and said pre-chamber heats the walls of said auxiliary chamber and said pre-chamber, such that upon introduction of air and fuel to said auxiliary chamber and said pre-chamber in a subsequent cycle, the hot walls of said auxiliary chamber and said pre-chamber heat the air and vaporize a portion of the fuel introduced therein.

38. The method in accordance with claim 37 wherein said injection of fuel includes injection of a stream of fuel into said auxiliary chamber, into said pre-chamber, and toward said passage.

39. The method in accordance with claim 37 including the additional step of substantially insulating a body defining said pre-chamber and said passage from said cylinder head.

40. A method for burning a mixture of fuel and air in an internal combustion engine having a cylinder defining a main combustion chamber, a piston reciprocally movable in the cylinder, and a cylinder head providing an end wall for the main combustion chamber; the method comprising the steps of:

providing a pre-chamber in communication with said main combustion chamber by way of a passage extending therebetween;

providing an auxiliary chamber in communication with said pre-chamber;

injecting fuel into said pre-chamber and said auxiliary chamber near an end of a compression stroke of said piston in said main combustion chamber, said injected fuel mixing with air forced from said main combustion chamber through said passage and into said pre-chamber and said auxiliary chamber;

firing a spark source in said auxiliary chamber to ignite a fuel-air mixture in said auxiliary chamber;

continuing injection of fuel which passes adjacent said auxiliary chamber, is inflamed adjacent said auxiliary chamber, and passes on to said pre-chamber, said continued injection of fuel and said flow of air from said main combustion chamber being ignited in said pre-chamber by the influx of ignited fuel, to force a high-velocity jet of hot air and unburned fuel, which atomizes into a fine spray of droplets, through said passage and into said main combustion chamber;

wherein said high-velocity jet causes vaporization, ignition and combustion of the fuel-air mixture in said main combustion chamber; and wherein said ignition and combustion of the fuel-air mixture in said auxiliary chamber and said pre-chamber heat the walls of said auxiliary chamber and said pre-chamber, such that upon introduction of air and fuel to said auxiliary chamber and said pre-chamber in a subsequent cycle, the hot walls of said auxiliary chamber and said pre-chamber heat the air and vaporize a portion of the fuel introduced therein.

41. The method in accordance with claim 40 wherein said injection of fuel includes injection of a stream of fuel into said pre-chamber adjacent said auxiliary chamber, and toward said passage.

42. The method in accordance with claim 41 including the additional step of substantially insulating a body defining said pre-chamber and said passage from said cylinder head.

* * * * *